United States Patent
Frank et al.

(10) Patent No.: US 11,506,185 B2
(45) Date of Patent: Nov. 22, 2022

(54) MAIN BEARING UNIT FOR THE ROTOR SHAFT OF A WIND TURBINE, AND WIND TURBINE

(71) Applicant: IMO HOLDING GMBH, Gremsdorf (DE)

(72) Inventors: Hubertus Frank, Hoechstadt (DE); Erich Russ, Gremsdorf (DE)

(73) Assignee: IMO HOLDING GMBH, Gremsdorf (DE)

( * ) Notice: Subject to any disclaimer, the term of this patent is extended or adjusted under 35 U.S.C. 154(b) by 94 days.

(21) Appl. No.: 16/649,053

(22) PCT Filed: Sep. 4, 2018

(86) PCT No.: PCT/EP2018/073738
§ 371 (c)(1),
(2) Date: Mar. 19, 2020

(87) PCT Pub. No.: WO2019/057485
PCT Pub. Date: Mar. 28, 2019

(65) Prior Publication Data
US 2020/0291927 A1    Sep. 17, 2020

(51) Int. Cl.
*F03D 80/70* (2016.01)
*F03D 15/00* (2016.01)

(52) U.S. Cl.
CPC ............ *F03D 80/70* (2016.05); *F03D 15/00* (2016.05)

(58) Field of Classification Search
CPC ................................ F03D 80/70; F03D 15/00
See application file for complete search history.

(56) References Cited

U.S. PATENT DOCUMENTS

| | | | |
|---|---|---|---|
| 9,771,924 B2 * | 9/2017 | Demtroder | ............... F03D 9/25 |
| 9,856,966 B2 * | 1/2018 | Wilson | ................... F03D 80/70 |
| 2013/0302144 A1 * | 11/2013 | Demtroder | ........... H02K 7/1838 |
| | | | 415/124.2 |

FOREIGN PATENT DOCUMENTS

| | | |
|---|---|---|
| EP | 1867871 A2 | 12/2007 |
| EP | 2573386 A1 | 3/2013 |
| GB | 2496256 A | 5/2013 |
| WO | 2012052022 A1 | 4/2012 |

OTHER PUBLICATIONS

International Search Report, Applicant: IMO Holding GMBH; International Application No. PCT/EP2018/073738, Filing Date: Sep. 4, 2018; 12 pgs.

* cited by examiner

*Primary Examiner* — Igor Kershteyn
*Assistant Examiner* — John S Hunter, Jr.
(74) *Attorney, Agent, or Firm* — Tarolli, Sundheim, Covell & Tummino LLP

(57) ABSTRACT

A main bearing unit for supporting the rotor shaft of a wind turbine, including a rolling bearing having an inner ring, an outer ring and a rolling element arrangement received between the outer and inner ring and a coupling arrangement which is designed to couple the rotor shaft to an output shaft of the wind turbine at least indirectly and so as to transmit torque. The rotor shaft is coupled to one of the outer and inner ring so as to transmit torque. The coupling arrangement is coupled so as to transmit torque to the one of the outer and inner ring as the rotor shaft.

11 Claims, 4 Drawing Sheets

MAIN BEARING UNIT FOR THE ROTOR SHAFT OF A WIND TURBINE, AND WIND TURBINE

CROSS-REFERENCE TO RELATED APPLICATIONS

This application is a U.S. National Stage Application filed under 35 U.S.C. § 371 of PCT/EP2018/073738, filed Sep. 4, 2018, and entitled MAIN BEARING UNIT FOR THE ROTOR SHAFT OF A WIND TURBINE, AND WIND TURBINE, which International Application claims the benefit of priority from German Patent Application No. 10 2017 008 878.0, filed on Sep. 21, 2017. The entire contents of each of the above-identified patent applications are incorporated herein by reference.

BACKGROUND

The present invention relates to a main bearing unit for supporting the rotor shaft of a wind turbine. The disclosure further relates to a wind turbine comprising such a main bearing unit.

In wind turbines, the rotor blades are typically connected to a rotor shaft in order to transmit a rotational movement generated by wind power to a generator unit. Further known units can be positioned between the rotor shaft and the generator unit, such as a gearbox or a brake, for example.

PRIOR ART

For the rotatable support of the rotor shaft so-called main bearing units are provided, which are arranged inside a nacelle or gondola of the wind turbine. In gearless wind turbines, the main bearing unit typically comprises only one bearing position, which can be arranged close to or directly in the area of the generator unit to achieve a compact design. If a gearbox is provided, locating and non-locating bearing combinations, which support the rotor shaft at two bearing positions, are often used as a main bearing unit.

Problem

During operation of the wind turbine, load-dependent deflections of the rotor shaft occur, which make reliable coupling to the generator unit difficult. This is the case in particular if the main bearing unit comprises a locating and non-locating bearing combination. Previous approaches to compensating for such problems are characterised by an adversely large construction size, however.

The object of the present disclosure accordingly is to provide a compact solution for supporting the rotor shaft that permits reliable coupling of the rotor shaft to the generator unit.

Proposed Solution

To achieve this object, a main bearing unit for supporting the rotor shaft of a wind turbine is proposed. The main bearing unit comprises a rolling bearing with an inner ring, an outer ring and a rolling element arrangement taken up between the outer and inner ring. The main bearing unit further comprises a coupling arrangement, which is designed to couple the rotor shaft at least indirectly and so as to transmit torque to an output shaft of the wind turbine.

In this case the rotor shaft and the coupling arrangement are coupled either to the outer ring or to the inner ring so as to transmit torque.

Properties, Advantages and Variants

The main bearing unit disclosed and claimed here enables a reduction in the construction size of the drive train of the wind turbine, since the coupling arrangement, which according to the implementations below can permit an offset and deflection compensation in particular, is coupled directly to a ring element (inner ring or outer ring) of the main bearing unit. This can also comprise a direct attachment to the ring element, for example via bolts and/or screw connections. Likewise, however, a one-piece design of at least a part of the coupling arrangement (for example, a first coupling element explained below) and the inner ring can be provided.

In the same sense, the rotor shaft also can be coupled directly to the outer ring or inner ring and in particular attached thereto, for example by way of a bolt connection. In another variant indirect coupling is realised via intermediate elements.

The construction size of the main bearing unit and/or of the drive train of the wind turbine can relate in particular to an axial construction size along the rotation axis of the rotor shaft, wherein this axial construction size can be reduced via a coupling of rotor shaft and coupling arrangement to the same ring element (inner or outer ring) of the main bearing unit. This applies in particular in comparison with existing solutions, in which couplings are arranged in the area of the gearbox unit or integrated into this. The indirect coupling to the output shaft so as to transmit torque can include the coupling arrangement transmitting a corresponding torque directly to the output shaft or to any intermediate shafts, gearbox units or the like, which are connected in turn to the output shaft (for example, in the form of a generator input shaft).

The rolling element arrangement can be formed in one or multiple rows, in particular in two or three rows. The rolling elements can be arranged here in rows, wherein each rolling element row is typically aligned and movable along an associated track. The rolling elements can comprise balls, cylinders, rolls, needles or tapers. The rolling bearing can be designed, for example, as a triple-row roller bearing, a triple-row tapered roller bearing, a triple-row tilted roller bearing or a preferably multiple-row axial-radial combination.

In one variant the rotor shaft is coupled to the inner ring. For this purpose a flange section of the rotor shaft and the inner ring can comprise through holes aligned with one another into which a connecting bolt can be inserted.

According to one embodiment, the coupling arrangement is designed to compensate at least partially for an offset between the rotor shaft and/or the main bearing unit and the output shaft coupled to the coupling arrangement. The output shaft can be a gearbox input shaft, an intermediate shaft or directly a generator input shaft. The offset can relate to an axial offset, for example between the rotation axes of the shafts connected via the coupling arrangement. Additionally or alternatively the offset can relate to an angular offset, which can relate in turn to the rotation axes of the shafts connected via the coupling arrangement.

To compensate for the offset, the coupling arrangement can comprise at least one elastic element. The elastic element can be manufactured from an elastically deformable material or can comprise such a material. The material can be an elastomer or a plastic such as polyamide, for example. In another variant a fibre-reinforced and/or a high-strength and low-abrasion plastic can be realised. The elastic material can be arranged in such a way that it can easily be replaced due to wear, in particular without extensive disassembly of the wind turbine or of its drive train. This can be achieved, for example, by the elastic element being designed in multiple parts and/or in the manner of segments and being insertable between coupling elements of the coupling arrangement, which are described below. The arrangement of elastic elements on connecting bolts realised according to one embodiment also facilitates a simple exchange.

In one variant the coupling arrangement comprises a first coupling element, which is coupled to the corresponding element of outer ring and inner ring, and a second coupling element, which is coupled at least indirectly to the output shaft. Coupling of the first coupling element to the outer or inner ring can also comprise an at least partial one-piece design of coupling element and the corresponding ring. The second coupling element can comprise a flange or another suitable structure in order to receive a connecting bolt. This can be receivable in turn in a flange section of the output shaft.

In one variant a torque transmission between the first and the second coupling element takes place at least partially via the elastic element. Expressed another way, the flow of forces and/or torque flow between the coupling elements can take place via or through the elastic element. This can thereupon be deformed accordingly, in particular to provide the desired offset compensation.

One embodiment provides that the first and second coupling element respectively comprise toothing and wherein the toothings of the coupling elements interact with one another so as to transmit torque. The toothing of the first coupling element can be designed, for example, as internal toothing and/or be formed on an internal circumferential region of this coupling element, whereas the toothing of the second coupling element can be formed as external toothing and/or on an external circumferential surface of this coupling element. The toothings can engage with one another so as to transmit torque or can be supported on one another so as to transmit torque at least indirectly. Any suitable engagement structure can be used in principle as toothing, but preferably a regular arrangement of projection-like teeth and depressions positioned in between them.

In one variant the toothing of the first coupling element is designed as spiral teeth. It is also conceivable in principle that the toothing of the second coupling element is designed as spiral teeth and/or that both coupling elements comprise corresponding spiral teeth.

One embodiment provides that the elastic element is arranged at least partially between the toothings. For example, the elastic element can be designed to be annular and be positioned radially between the coupling elements. In addition or alternatively, the elastic element can be arranged in an engagement area between the toothings, so that the toothings do not come into direct contact, or only do so to a predetermined extent. Offset compensation between the coupling elements can be achieved thereupon via a compression of the elastic element between the toothings. In this variant the elastic element can be suitably profiled to interact with the toothings. For example, it can comprise a correspondingly shaped engagement structure and in particular a toothing that can preferably be brought into engagement with both of the coupling elements or their toothings. Furthermore, the elastic element can be formed in multiple parts and/or in the form of segments, wherein the individual segments can be designed and arranged according to the above variants.

According to a further development, the first and second coupling element are coupled to one another via at least one bolt so as to transmit torque. For example, the coupling elements can each comprise a flange and/or an annular area, which each have through holes aligned with one another. The bolt can be inserted into these holes and the coupling elements thus attached to one another so as to transmit torque.

In one variant the elastic element is arranged on the bolt, for example in the form of an elastic sheathing. The elastic element can (especially in the form of a sheathing) be arranged on a bolt section that is coupled to or in engagement with at least one of the coupling elements. This can relate to a free end region of the bolt shaft, for example. The sheathing can occupy approx. half of the bolt length, for example. Alternatively or in addition, an elastic element can be arranged between the bolt and a hole receiving the bolt, for example in the form of an insert element or an internal wall coating of the hole. Offset compensation is again made possible by this, as at least one of the coupling elements is movable to a defined extent relative to the other.

The disclosure further relates to a wind turbine, comprising a main bearing unit according to one of the previous aspects. The wind turbine can comprise a gondola or nacelle in which the rotor shaft and the main bearing unit are received at least partially.

In one variant the wind turbine comprises the rotor shaft coupled to the main bearing unit and a gear unit, which is or can be coupled to the output shaft, wherein the coupling arrangement is designed to couple the rotor shaft and the gearbox unit so as to transmit torque. The output shaft can form a gearbox input shaft in this case.

The device details explained above are depicted connected; let it be pointed out, however, that they are also independent of one another and can also be freely combined with one another. The relations shown in the figures of the individual parts and sections of these to one another and their dimensions and proportions should not be understood as restrictive. On the contrary, individual dimensions and proportions can also diverge from those shown.

Nor do the claims limit the disclosure and thus the combination options of all features shown. All features shown are explicitly disclosed here also individually and in combination with all other features.

BRIEF DESCRIPTION OF THE DRAWINGS

Possible implementations are now explained in greater detail by means of the enclosed schematic depictions.

DETAILED DESCRIPTION OF THE DRAWINGS

The device variants described here as well as their functional and operating aspects serve purely for a better understanding of their structure, mode of operation and properties; they do not restrict the disclosure to the exemplary embodiments shown, for instance. The figures are schematic, wherein substantial properties and effects are depicted in part significantly enlarged, in order to clarify the functions, active principles, technical configurations and features. Here each mode of operation, each principle, each technical configuration and each feature which is/are disclosed in the figures or in the text can be combined freely and in any way with all claims, each feature in the text and in the other figures, other modes of operation, principles, technical configurations and features that are contained in this disclosure or result from it, so that all conceivable combinations are to be associated with the devices described. Combinations between all individual implementations in the text, meaning in each section of the description, in the claims and also combinations between different variants in the text, in the claims and in the figures are also comprised here and can be made the subject matter of further claims. Nor do the claims limit the disclosure and thus the combination possibilities of all features demonstrated with one another. All disclosed features are disclosed here explicitly also individually and in combination with all other features.

In the figures, components corresponding to one another or similar in function are provided with corresponding reference signs. The devices are now described by means of exemplary embodiments.

Figure 1:
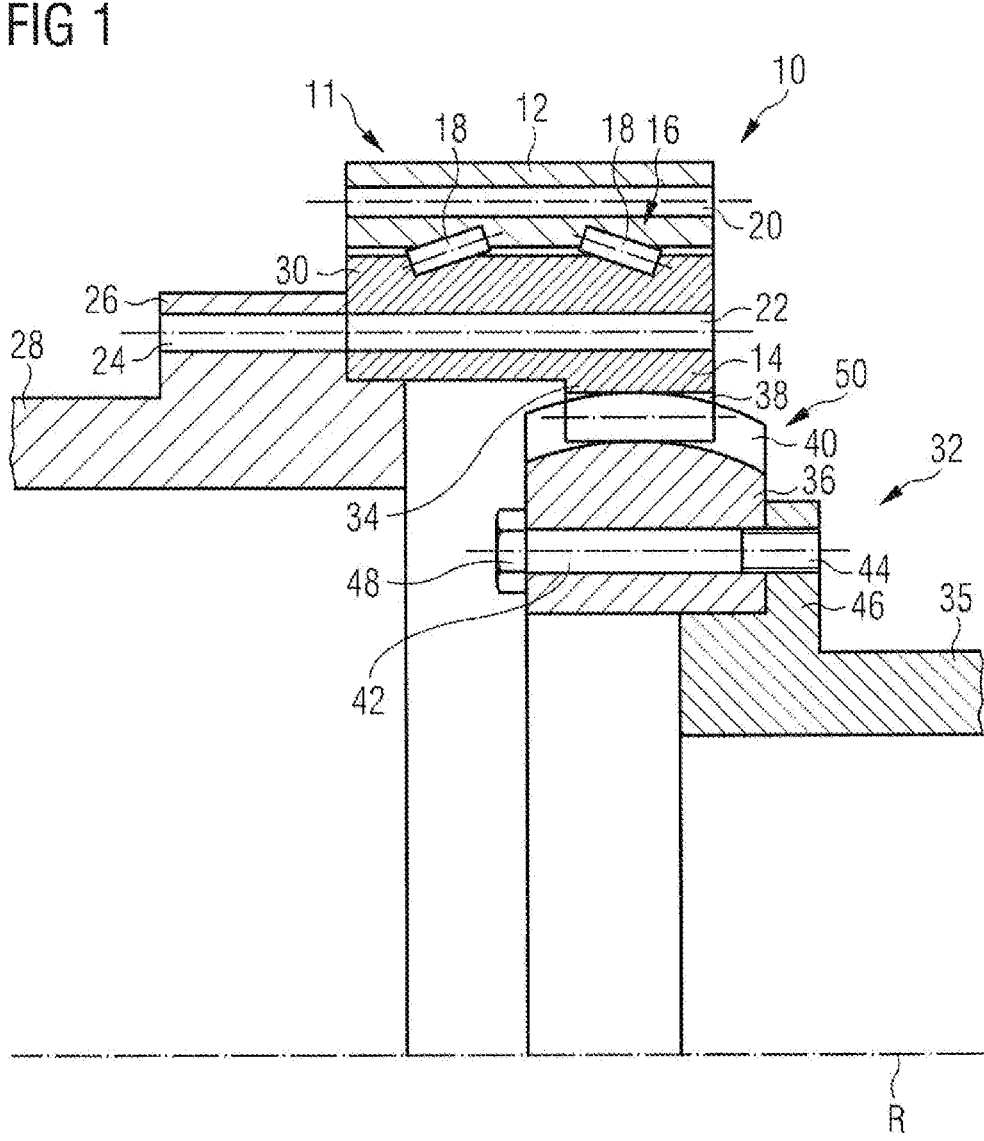
FIG. 1 shows a sectional view of a main bearing unit according to a first embodiment containing the rotational axis.

A sectional view of a main bearing unit 10 of a wind turbine according to a first embodiment is shown in FIG. 1. The main bearing unit 10 comprises a rolling bearing 11 with an outer ring 12 and an inner ring 14. Arranged between the rings 12, 14 is a double-row rolling element arrangement 16, which comprises several rolling elements 18 in the form of diagonal rollers. The outer ring 12 comprises a through hole 20 in order to attach the outer ring 12 to a fixed area of a wind turbine. The inner ring 14 likewise comprises a through hole 22. This through hole 22 is in line with a corresponding through hole 24 in a flange area 26 of a rotor shaft 28, which is only partially depicted.

The rotor shaft 28 is connected to rotor blades of the wind turbine, which are not depicted in greater detail, and rotates together with these about a rotational axis R. By way of a bolt, which is not depicted and which can be inserted in the through holes 24, 22, the rotor shaft 28 is attached to the inner ring 14 of the main bearing unit 10 so as to transmit torque. In FIG. 1 it is further recognized that the rotor shaft 28 and in particular its flange area 26 abut here on a first end face 30 of the main bearing unit 10.

The main bearing unit 10 further comprises a coupling arrangement 32, which is coupled to a schematically indicated output shaft 35. The output shaft 35 in the case shown is a gearbox input shaft, which is coupled in turn via gearbox, not depicted, to a generator input shaft, which is not shown, so as to transmit torque. The coupling arrangement 32 comprises two coupling elements 34, 36. The first coupling element 34 is moulded here in one piece onto the inner ring 14 and is thus coupled to the inner ring 14 so as to transmit torque. The first coupling element 34 further comprises inner toothing 38, which runs around the rotational axis R.

The second coupling element 36, on the other hand, is formed to be annular and has spiral teeth 40 on its external circumferential surface. The spiral teeth 40 and inner toothing 38 interact so as to transmit torque.

Finally the second coupling element 36 has in turn a through hole 42, which is in line with a through hole 44 in a flange area 46 of the output shaft 35. A connecting bolt 48 is inserted into the corresponding through holes 42, 44 to couple the output shaft 35 and the coupling arrangement 32 with one another so as to transmit torque.

It is understood that an arbitrary plurality of all of the through holes 20, 24, 42, 44 explained above and bolts inserted therein can be provided to attach the corresponding elements securely to one another. The through holes 20, 24, 42, 44 and bolts inserted therein can be distributed here uniformly and/or annularly in a circumferential direction.

In operation of the wind turbine, a rotation of the rotor shaft 28 is transmissible due to the bolt connection explained to the inner ring 14, which rotates about the rotational axis R in relation to the fixed outer ring 12. The first coupling element 34, which rotates together with the inner ring 14, transmits this rotation via the toothings 38, 40 to the second coupling element 36 and thus to the output shaft 35.

It is already clear from FIG. 1 that arranging the coupling arrangement 32 directly on the rolling bearing 11 and even partial integration into the inner ring 14 facilitates a compact design of the main bearing unit 10. In particular, the axial construction size along the rotational axis R is reduced by this.

Figure 2:
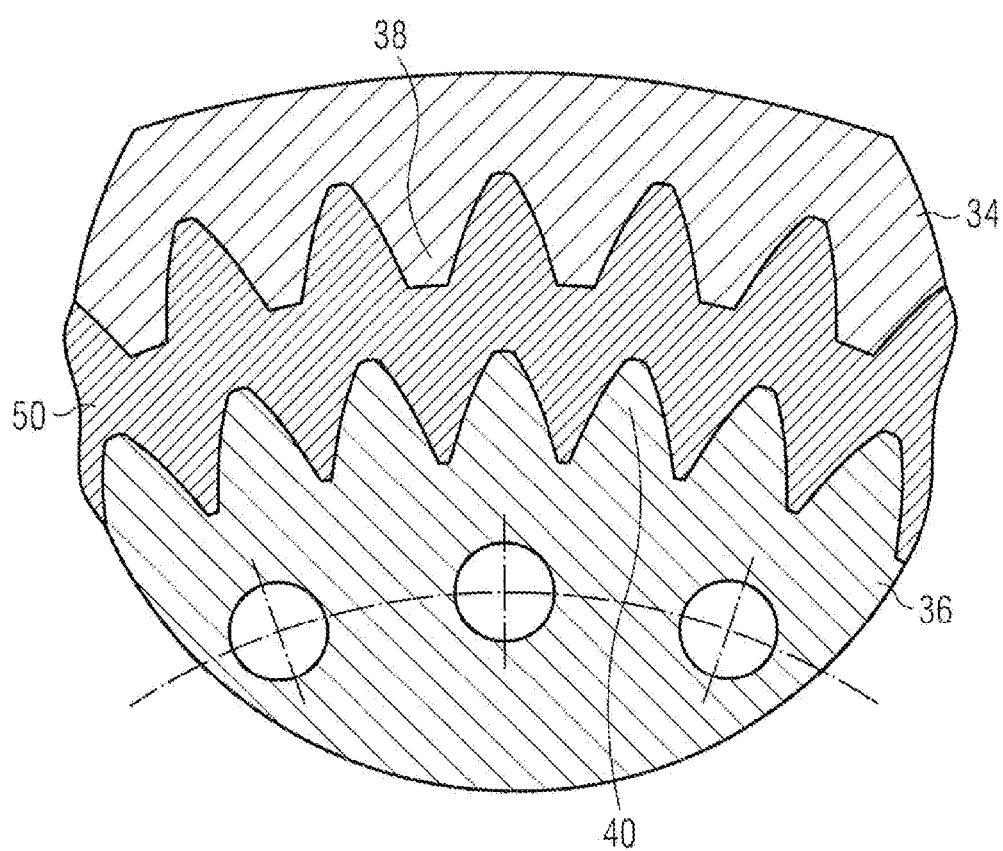
FIG. 2 shows a detail view of the first embodiment to explain an elastic element of the coupling arrangement.

The coupling arrangement 32 is additionally characterised, however, in that it comprises an elastic element 50 (see FIG. 2). This is inserted between the toothings in such a way that a torque transmission takes place between the coupling elements 34, 36 via this elastic element 50.

This becomes clear from the schematic detail view in FIG. 2. The visual axis of FIG. 2 corresponds here to a perpendicular extension of the rotational axis R to the sheet plane. The inner toothing 38 and the spiral teeth 40 of the two coupling elements 34, 36 are again recognisable. However, these are not directly in contact or engagement with one another, but are each only in engagement with the elastic element 50, which likewise has a toothed profile.

A rotation of the inner toothing 38 is thus transmitted purely indirectly via the elastic element 50 to the spiral teeth 40. Since the element 50 is designed elastically, however, axial offsets or angular errors between the coupling elements 34, 36 can be compensated in this case in the manner of an offset compensation. The elastic element 50 can be formed as a closed ring or also comprise a number of segments that can be handled separately and which each span only a limited angular area.

Other embodiments of a main bearing unit 10 are described below with reference to FIGS. 3 and 4. Features that remain the same or act in the same manner compared with the first embodiment are provided here with the same reference signs.

Figure 3:
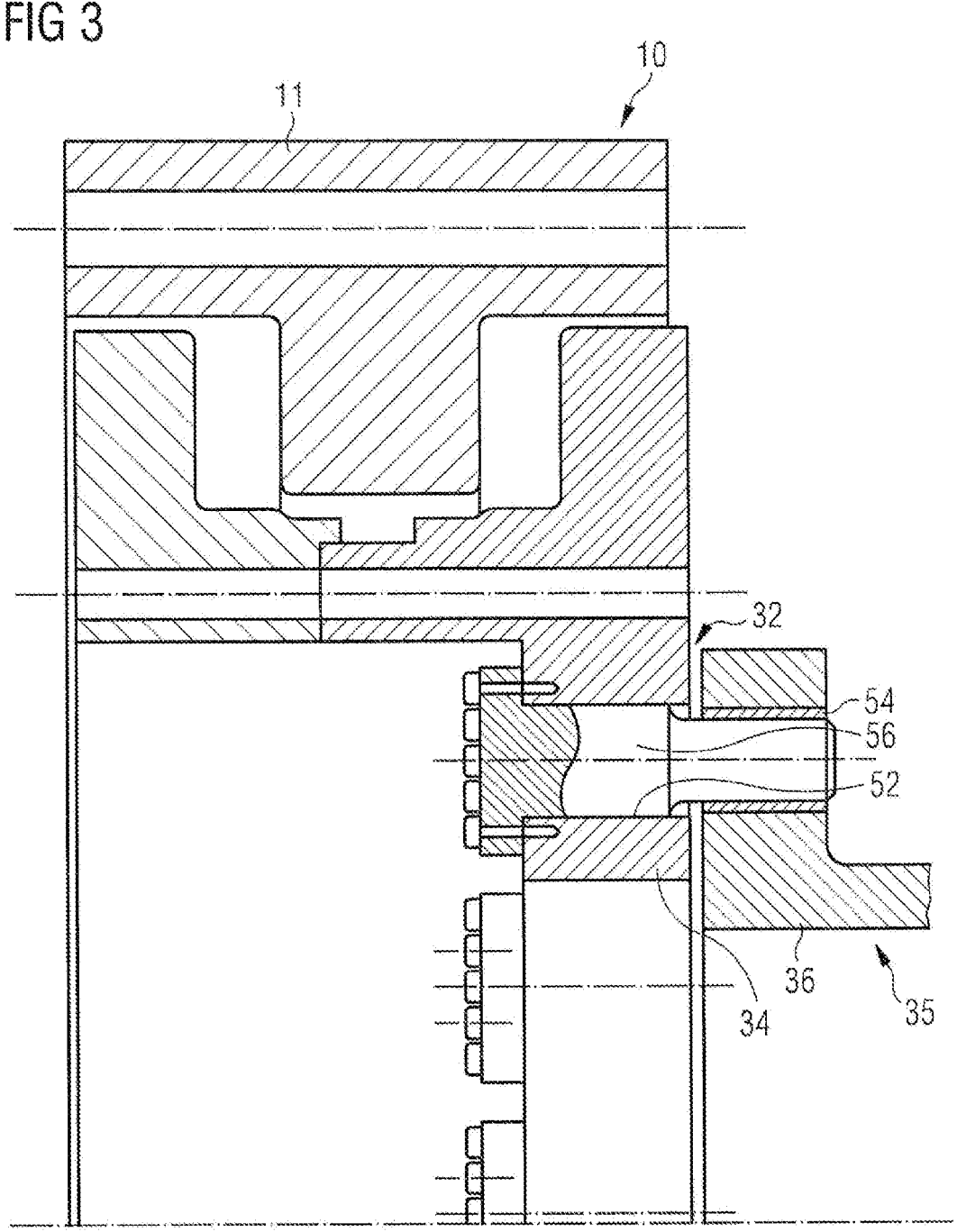
FIG. 3 shows a sectional view of a main bearing unit according to a second embodiment containing the rotational axis.

In FIG. 3 a main bearing unit 10 according to a second embodiment is indicated purely schematically without showing again in greater detail the inner structure of the rolling bearing 11 and the connection to the rotor shaft 28, which is not depicted.

The first coupling element 34 is again recognisable, however, which is designed once again as a flange-like projection in one piece with the inner ring 14 of the rolling bearing 11, which ring is not depicted.

The first coupling element 34 comprises a through hole 52, which is in line with a through hole 54 in a second coupling element 36. The second coupling element 36 is again designed as a flange and in one piece with an output shaft 35 not depicted in greater detail. To connect the coupling elements 34, 36, a bolt 56 is provided. At its end protruding into the through hole 54 of the second coupling element 36, the bolt 56 is sheathed by an elastomer material (not illustrated in FIG. 3), which in turn forms an elastic element 50 of the coupling arrangement 32.

In the context of the present disclosure it is also conceivable in principle that the elastic element 50 is formed separately from the bolt 56 and is arranged as an insert part, for example, in one of the through holes 52, 54. The elastic element 50 can likewise be designed as an internal wall coating of at least one of the through holes 52, 54. Any combinations of these variants are also conceivable. It is further understood that an arbitrary plurality of bolts 56 can be provided to attach the coupling elements 34, 36 securely to one another.

It is again made possible via the elastic element 50 that axial offsets and angular errors between the coupling elements 34, 36 and the other elements coupled respectively thereto can be compensated.

Figure 4:
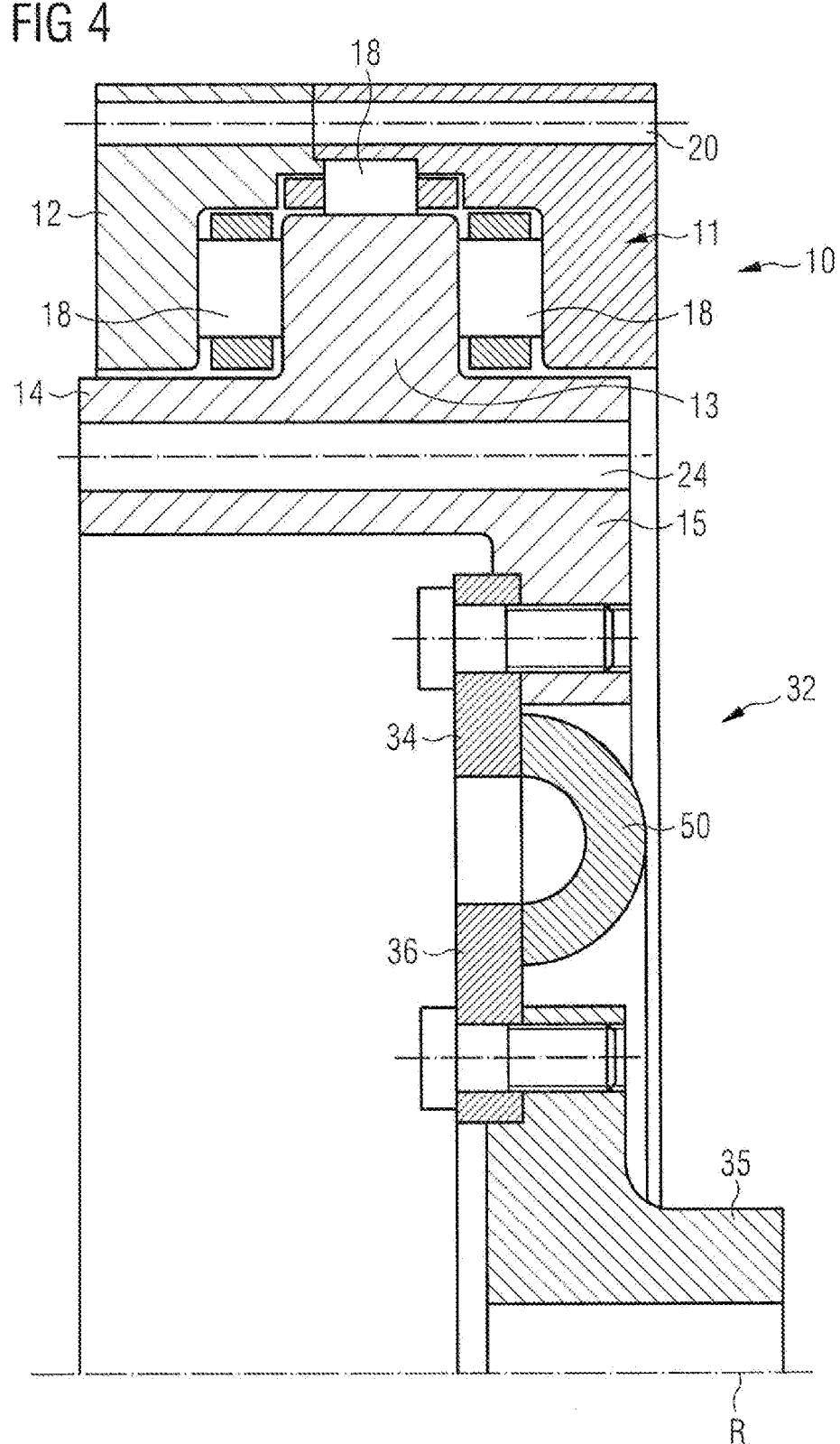
FIG. 4 shows a sectional view of a main bearing unit according to a third embodiment containing the rotational axis.

A third embodiment is shown in FIG. 4. In this case the main bearing unit 10 is shown in greater detail, so that a two-part outer ring 12 and an inner ring 14 with a circumferential nose 13 in the manner of a projection are recognised. The rolling bearing 11 in this case comprises a triple-row arrangement of cylindrical rolling elements 18. By analogy with the embodiment from FIG. 1, the outer ring 12 and the inner ring 14 again have through holes 20, 24, wherein the inner ring 14 is connected by means of the through hole 24 to a rotor shaft 28, not depicted, so as to transmit torque. The extension of the rotational axis R is also marked in FIG. 4 analogously to FIG. 1.

A first annular coupling element 34 is again attached to the inner ring 14. More precisely, the annular coupling element 34 is attached by means of a screw connection to an annular section 15 of the inner ring 14 protruding in a flange-like manner. A second annular coupling element 36 is arranged so to speak radially inside the coupling element 34, as it has a smaller diameter. The second coupling element 36 is connected via a screw connection to an output shaft 35.

It is again understood that an arbitrary plurality of through holes 20, 24 and screw connections can be provided to attach the relevant elements securely to one another.

The coupling arrangement 32 in the case shown again comprises an elastic element 50. This is designed as an intermediate ring that connects the coupling elements 34, 36 to one another so as to transmit torque. The elastic element 50 can be glued to the coupling elements 34, 36 in this case or attached in another way. Once again offset and angular errors between the elements coupled via the coupling arrangement 32 can be compensated for via the elastic element 50 arranged in the force and torque flow.

The invention claimed is:

1. A main bearing unit for supporting a rotor shaft of a wind turbine, comprising:
   a rolling bearing with at least one inner ring, at least one outer ring and a rolling element arrangement taken up between the at least one outer ring and the at least one inner ring;
   a coupling arrangement adapted to couple the rotor shaft at least indirectly to an output shaft of the wind turbine to transmit torque from the rotor shaft to the output shaft of the wind turbine,
   wherein the rotor shaft is coupled to the at least one inner ring so as to transmit torque and rotate together with the at least one inner ring,
   wherein a flange section of the rotor shaft and the at least one inner ring comprise through holes aligned with one another through which a connecting bolt extends,
   wherein the coupling arrangement is coupled to the at least one inner ring and is adapted to receive torque from and rotate together with the at least one inner ring,
   wherein the coupling arrangement comprises an elastic element, and a torque transmission between a first coupling element and a second coupling element of the coupling arrangement takes place via the elastic element, and
   wherein the coupling arrangement is attached directly to or is integrated into the at least one inner ring.

2. The main bearing unit according to claim 1, wherein the elastic element is adapted to at least partially compensate for an offset between the rotor shaft and/or the main bearing unit and the output shaft coupled to the coupling arrangement.

3. The main bearing unit according to claim 1, wherein the first coupling element is coupled to the at least one inner ring, and the second coupling element is coupled at least indirectly to the output shaft.

4. The main bearing unit according to claim 1, wherein the first coupling element and the second coupling element each comprise toothing and wherein the toothings of the first coupling element and the second coupling element interact with one another so as to transmit torque.

5. The main bearing unit according to claim 4, wherein the toothing of the second coupling element includes spiral teeth.

6. The main bearing unit according to claim 1, wherein the first coupling element and the second coupling element each comprises toothing and wherein the elastic element is arranged at least partially between the respective toothings.

7. The main bearing unit according to claim 1, wherein the first coupling element and the second coupling element are coupled to one another via at least one bolt so as to transmit torque.

8. The main bearing unit according to claim 1, wherein the elastic element is arranged on the bolt.

9. The main bearing unit according to claim 8, wherein the elastic element is formed as an elastic sheathing.

10. A wind turbine comprising the main bearing unit according to claim 1.

11. The wind turbine according to claim 10, comprising the rotor shaft coupled to the main bearing unit and a gearbox unit, which is coupled or couplable to the output shaft, wherein the coupling arrangement of the main bearing unit is designed to couple the rotor shaft and the gear box unit by way of the output shaft so as to transmit torque.

* * * * *